United States Patent
Barth et al.

[11] Patent Number: 5,806,986
[45] Date of Patent: Sep. 15, 1998

[54] TUBULAR LINEAR GUIDE SYSTEM WITH INTERNALLY POSITIONED GUIDED BODY

[75] Inventors: Waldemar Barth, Weil-Breitenstein; Uwe Schön, Echterdingen; Andreas Kec, Dettenhausen; Martin Christmann, Reutlingen, all of Germany

[73] Assignee: NEFF Antriebstechnik Automation GmbH, Waldenbach, Germany

[21] Appl. No.: 799,620

[22] Filed: Feb. 12, 1997

[30] Foreign Application Priority Data

Feb. 14, 1996 [DE] Germany ............. 196 05 388.9

[51] Int. Cl.⁶ .................................................. F16C 29/06
[52] U.S. Cl. .................................................. 384/45
[58] Field of Search .................. 384/45, 44, 43; 464/168

[56] References Cited

U.S. PATENT DOCUMENTS

| | | |
|---|---|---|
| 3,071,418 | 1/1963 | Hayes . |
| 4,765,754 | 8/1988 | Slocum . |
| 4,902,143 | 2/1990 | Morita . |
| 4,921,361 | 5/1990 | Steeves . |
| 5,217,308 | 6/1993 | Schroeder . |
| 5,344,237 | 9/1994 | Takei et al. . |

FOREIGN PATENT DOCUMENTS

| | | |
|---|---|---|
| 0 268 011 A1 | 5/1988 | European Pat. Off. . |
| 0 483 384 A1 | 5/1992 | European Pat. Off. . |
| 38 05 392 | 8/1989 | Germany . |
| 40 05 582 | 9/1991 | Germany . |
| 43 34 311 | 4/1995 | Germany . |
| 295 09 952 U1 | 9/1995 | Germany . |
| 466 645 | 1/1969 | Switzerland . |

*Primary Examiner*—Lenard A. Footland
*Attorney, Agent, or Firm*—Frishauf, Holtz, Goodman, Langer & Chick, P.C.

[57] ABSTRACT

The linear guide system is formed by a tubular body (2) which, internally, has at least three and preferably four guide tracks (33–36, 42, 43) formed, for example, as steel rails (33–36) inserted in an aluminum extrusion which forms the guide body. A slit (7) extends through the outside of the guide body (2); within the guide body, a portion (8) of a carriage is located, which portion includes two bearing elements (11) on either side, formed with two outer tracks (14, 15) for a group of balls (10) to run on the bearing (9) formed by the tracks in the guide body (2) and on the bearing elements (11). To return the balls, upon motion of the carriage, ball return guide elements (24, 25) are located on both ends of the bearing elements (11), and so arranged that they take balls from an upper track (14) and pass them through a duct (16) near the bottom of the bearing element (11). Another set of balls, running on a lower track (15), is returned through an upper duct (17), so that the balls will circulate in loops which, within the ball return guide elements (24, 25) form crossing paths (27, 28) which are separated in space so that the paths (27, 28) do not intersect. This arrangement places the bearings (9) within the tubular body for protection against contamination and provides for a large radius of curvature of the curved portion of the closed-loop paths within the ball return guide elements (24, 25). This permits higher operating speed, while providing for smooth running, and low-noise level.

38 Claims, 4 Drawing Sheets

TUBULAR LINEAR GUIDE SYSTEM WITH INTERNALLY POSITIONED GUIDED BODY

Reference to related patents and applications, the disclosures of which are hereby incorporated by reference:

U.S. Pat. No. 3,071,418, Hayes;
U.S. Pat. No. 5,217,308, Schroeder;
U.S. Pat. No. 4,902,143, Morita;
U.S. Pat. No. 4,765,754, Slocum;
U.S. Ser. No. 08/799,621, filed Feb. 12, 1997, Barth et al.

Reference to related patent publications:

German Utility Model 295 09 952U;
German 40 05 582, Hauser;
German 38 05 392, Kaiser;
German 43 34 311, Desbree.

FIELD OF THE INVENTION

The present invention relates to a linearly guided system, and more particularly to a linearly guided system which includes a hollow guide body in which a guided element is located.

BACKGROUND

Linear guide systems are used for retention of machine elements which can move along a predetermined axis, defining a moving or operating path. Usually, such elements have a carriage, forming a movable element, which is retained on a guide body, to operate with as little friction and noise as possible. The linear guide arrangements are also referred to as linear bearings, specifically when they are coupled to a drive arrangement, and then can be used as linear drives for longitudinal displacements, and power transfer, or, if not coupled to a power unit, can operate as sensors determining position or movement along the predetermined path. Linear guide systems, and particularly when used as linear drives, are frequently subject to dirt and contamination; yet, they should operate reliably and with minimum maintenance.

German Patent 40 05 582, Hauser, assigned to the assignee of this application, discloses a linear bearing which has a guide rail of, in cross-section, essentially rectangular shape. A carriage is linearly movable along the guide rail. The carriage, as well as the guide rail, is made of steel and is supported on the guide rail by two rows of ball bearing balls. The guide rail has a longitudinally extending recess, or slit, into which a corresponding projecting element, or portion of the carriage extends. The two flanks adjacent the slit are formed with longitudinally extending guide grooves for the balls and to provide for bearing of the carriage. The carriage is formed with projections opposite the grooves for the bearing balls. As the carriage moves, the balls are released from engagement between the carriage and the rail at the trailing end of the carriage, and are led back to the forward end, so that there are always enough balls between the carriage and the guide rail. To lead the balls back, two ball return ducts are provided, and, additionally, two ball return elements to guide the balls to and from the return ducts are located at the end surfaces of the carriage. These ball return elements may each be formed as an injection molded plastic structure, for example molded directly on the carriage, and extending over the flat backside of the carriage, as well as over the two facing ends.

The ball return carriages, as well as the end return portions, are located next to each other within the plastic element forming or defining the ball return ducts. At the facing ends of the ball return element, the ball ducts are curved in approximately C-shape. Adjacent return duct portions are passed by the balls, upon movement of the carriage, in the same direction. The portions at the backside of the carriage are straight and parallel with respect to each other.

Any dirt which is in the vicinity of the slit, and passes therethrough, may increase friction, wear-and-tear, and operating noise.

As the carriage moves, the balls run in their recirculating loop path with half the speed of the carriage. In the curved portions of the recirculating path, the balls are accelerated in order to surpass the front end of the carriage. These acceleration regions, which, in effect, are the curved portions of the ball return paths, cause operating noise, particularly when the carriage is moved rapidly.

Manufacturing the carriage with a plastic portion to form a ball return path is relatively complex. The carriage, and the guide rail, must be constructed with relatively small tolerances, in order to ensure good operating conditions. This is particularly true for the plastic body to be secured to the carriage. To make this plastic body, it is necessary to provide forming cores, or mandrels, in accordance with the shape of the ball return ducts in the ball return elements to be secured to the carriage. After injection molding with a thermosetting plastic, the core elements, or mandrels, are removed by thermal or chemical treatment.

THE INVENTION

It is an object to provide a linear guide system which has improved operating or running characteristics, particularly at high operating speeds, which can be readily made by mass-production technology, and which is less subject to contamination by dirt, dust, or other environmental conditions affecting precision apparatus.

Briefly, the guide body is formed as a tubular structure which has at least two, preferably four, spaced-apart, parallel guide tracks defining a movement path. A movable force, or motion transfer element, which is externally accessible, is located within the interior of the tubular guide body. A plurality of longitudinal bearings and roller elements, typically rolling balls, movably couple the force or motion transfer element to the body. For simplicity, the specification will hereinafter refer only to the preferred rolling elements, that is, "balls", although it is understood that this designation equally covers other rolling elements, e.g. rollers, as well. Ball return guides receive the balls to return them to the bearing, in such a way that the balls will operate in a closed loop, or closed path. The bearings are located in the interior space of the tubular element which extends longitudinally of the guide body.

Preferably, the ball return portions of the force or motion transfer element, or parts thereof, are so arranged that the return path in the end portions for the balls of the two bearings cross each other, so that, for example, a ball which was operating in an upper bearing race is returned through a return duct which is adjacent a lower bearing race, but separated from the lower bearing race, and, conversely, a ball which operated in the lower bearing race is returned to a longitudinal return duct close to the upper bearing race; of course, at the front or leading end of the carriage, the same cross-over situation prevails, so that a ball received from a lower return duct will be fed back to the bearing at the top of the carriage.

Arranging the bearings in the interior space formed by the tubular guide body effectively protects the bearings for the guide body against contamination. The running surfaces of the bearings are thereby continuously maintained in clean, uncontaminated condition. This increases the lifetime, intervals between servicing, reduces maintenance expenses and ensures quiet, noise-free or no-noise running of the movable element in its linear bearings.

The guide body is constructed to be roughly of tubular shape, and is formed with a longitudinal slit to connect or couple the interiorly located carriage with outwardly positioned machine elements, by a motion or force transfer part. The guide rail, preferably, is an extruded aluminum profile body which can be made in substantial lengths, to be cut to size, as required.

To additionally protect the interior of the tubular body, a cover tape is provided which is releasably retained on the guide body. The cover tape is so arranged that, in the region of the force or motion transfer element, the cover tape is released from the guide body whereas, in regions beyond the carriage, it covers the longitudinal slit.

Preferably, the tracks on which the balls, preferably ball bearing balls, run are formed by steel rails which can be longitudinally pushed in to a precast groove of the aluminum guide body, and held in a groove by an interengaging projection-and-recess fit, similar to a dovetail fit. This permits particularly inexpensive manufacture, the guide rail as a whole providing, due to their effectively externally closed form, good protection of the carriage and the bearing system, ensuring protection against contamination and damage, thereby increasing the reliability of the linear guide element.

The carriage should, preferably, be so guided that it cannot tilt or twist within the guide body. Three bearings provide for such a twist-free retention of the movable element; in accordance with a preferred embodiment, however, four elongated linear bearings are provided, positioned, in cross-section, close to corners of a rectangle, or a trapeze.

In accordance with a feature of the invention, a drive system is coupled to the drive carriage. This permits use of the system as a linear drive, or linear positioning element. Preferably, the bearing elements are located adjacent a central drive arrangement, ensuring good support of the carriage by the outwardly positioned bearings and guide rails therefor.

The changeover of balls from a position in the bearing to a return duct is done by end ball guide elements. Two such changeover paths can be formed in one element, which results in efficient use of space. The roller return guide element, for short hereinafter, the ball return guide, determines the return path of the balls on the carriage. The ball return guides can be made as a singular unitary item, or in a plurality of parts, having the appropriate return guide ducts formed therein. These ducts can also be formed, at least in part, by separate plastic elements, joined together.

In accordance with a feature of the invention, the return guide paths are so arranged that in the deflection regions, that is, in the curved portions of the return path, they cross over in space. As a result, there is maximum spacing between the portion of the ball race which has bearing functions and the portion which returns the balls. The radius of curvature of the ball return path thus can be increased, so that the degree of curvature itself is decreased. Cross-over of the return paths or tracks in the end or face portions of the carriage, i.e. in the ball return guides, results in formation of the return path from one track parallel to and in the vicinity of the bearing portion of another track. Even if space is tight, and a carriage is to be made small, the return path can be arranged to be space efficient and so placed that, due to the smaller rate of curvature, the balls will nevertheless move with minimum noise and provide for smooth operation of the carriage.

The efficient utilization of space, and the smaller overall radius of curvature permits use of comparatively large balls and thus duct diameters without interfering with the operating conditions of the carriage. Large balls permit high loading and carrying capacity, so that it is possible to increase the weight carrying capability of a linear displacement element with still small carriages.

The radius of curvature at the ball return guides is preferably about half the spacing of the running tracks of the balls; at least, it is greater than one-quarter of the spacing of running tracks. The larger this radius, the better the noise reduction in operation of the carriage.

Forming the return portions of the overall feedback or return path in a cross-over at the ends also permits arranging all the internal straight portions of the paths of the balls in a single plane. This, then, further permits formation of the return ducts through the carriage merely as longitudinal bores therethrough. The carriage, thus, can be constructed in particularly narrow, flat form. The balls redirected preferably in separate ball return guide elements which are secured at end faces of the carriage, and formed as attached plastic bodies, each having two, approximately U-shaped ducts which cross each other, in space. The carriage itself can be of simple construction and made simply. The ball return guide elements at the ends, as plastic bodies, can be made in separate manufacturing steps, and are then secured, in appropriate position, to the carriage, aligned therewith, for example by a peg-and-hole arrangement. Other interlocks may be used.

The carriage can be reduced in size, and the inherent quietness of operation and weight-carrying possibility permits to location of the carriage within the interior of the guide body.

DETAILED DESCRIPTION

Figure 1:
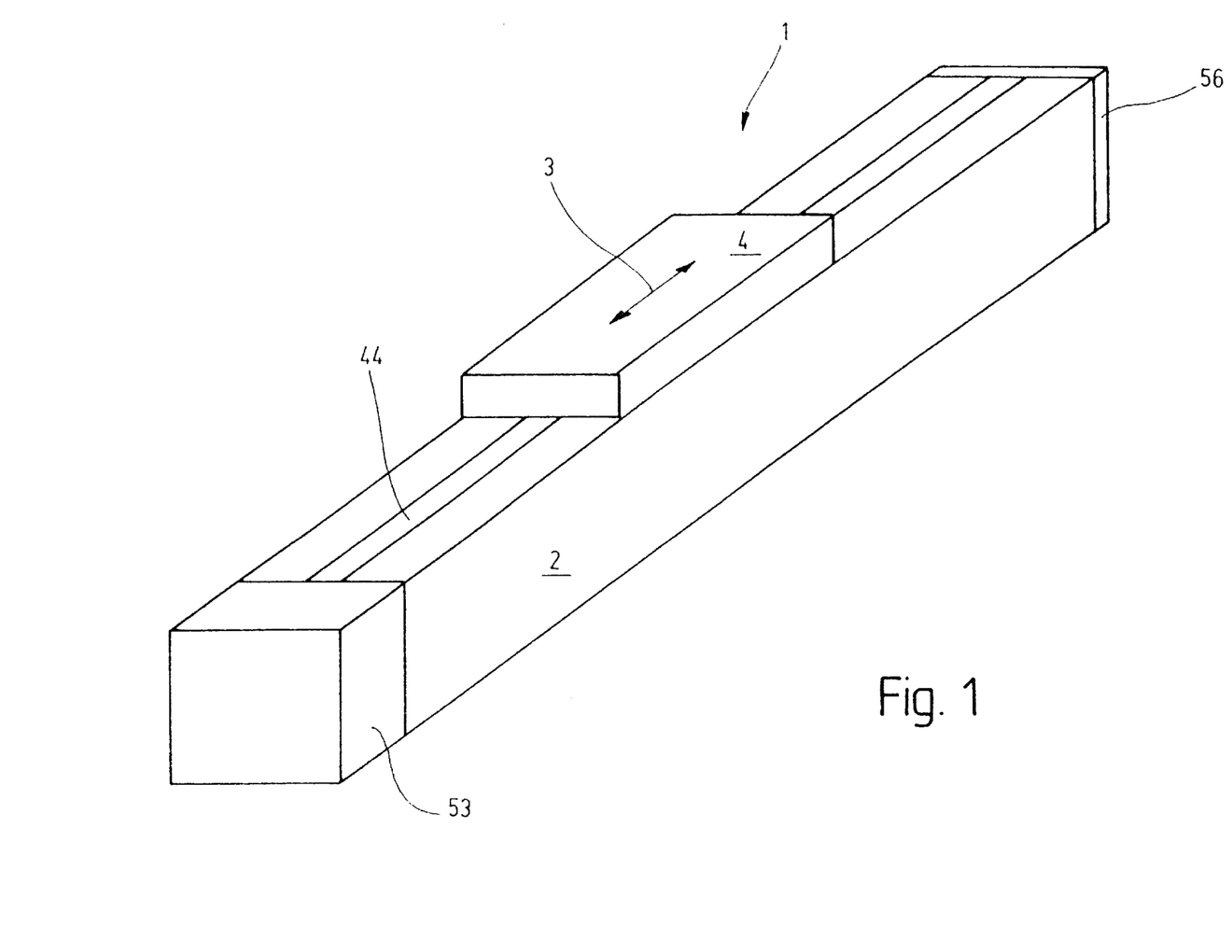
FIG. 1 is a schematic perspective view of a linear guide body.
Figure 2:
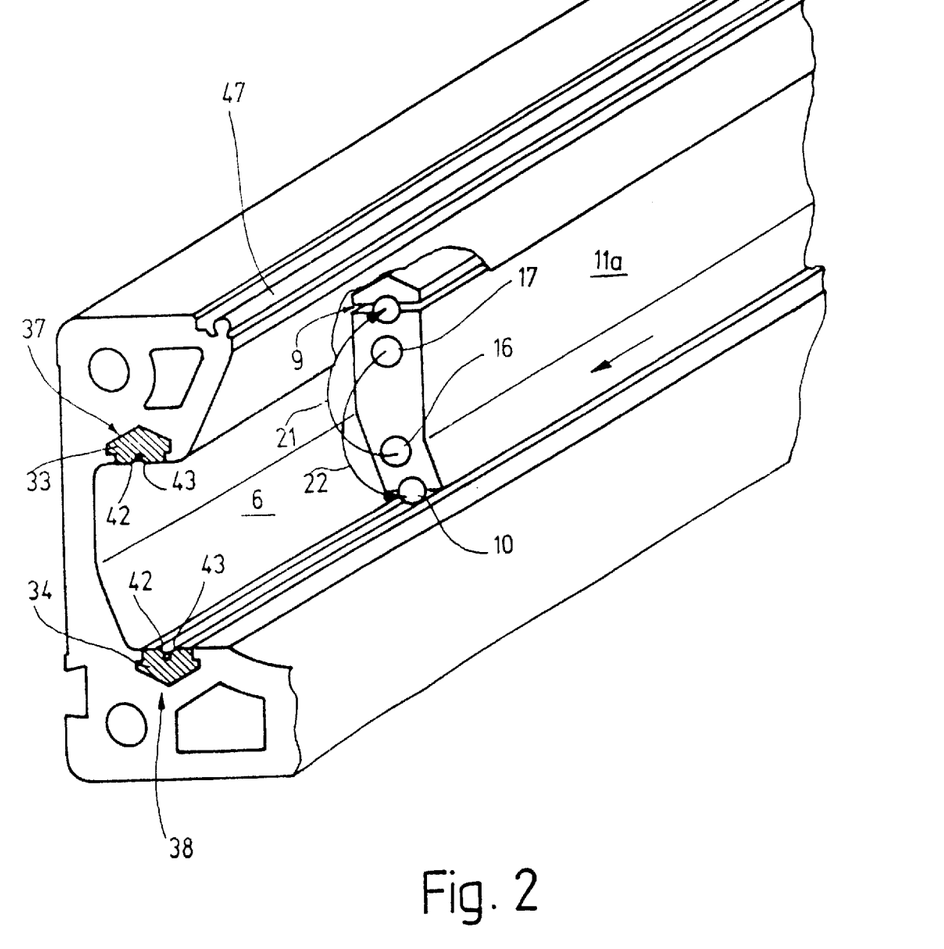
FIG. 2 shows the linear guide body of FIG. 1, in perspective representation, partly cut away, and to a larger scale.
Figure 5:
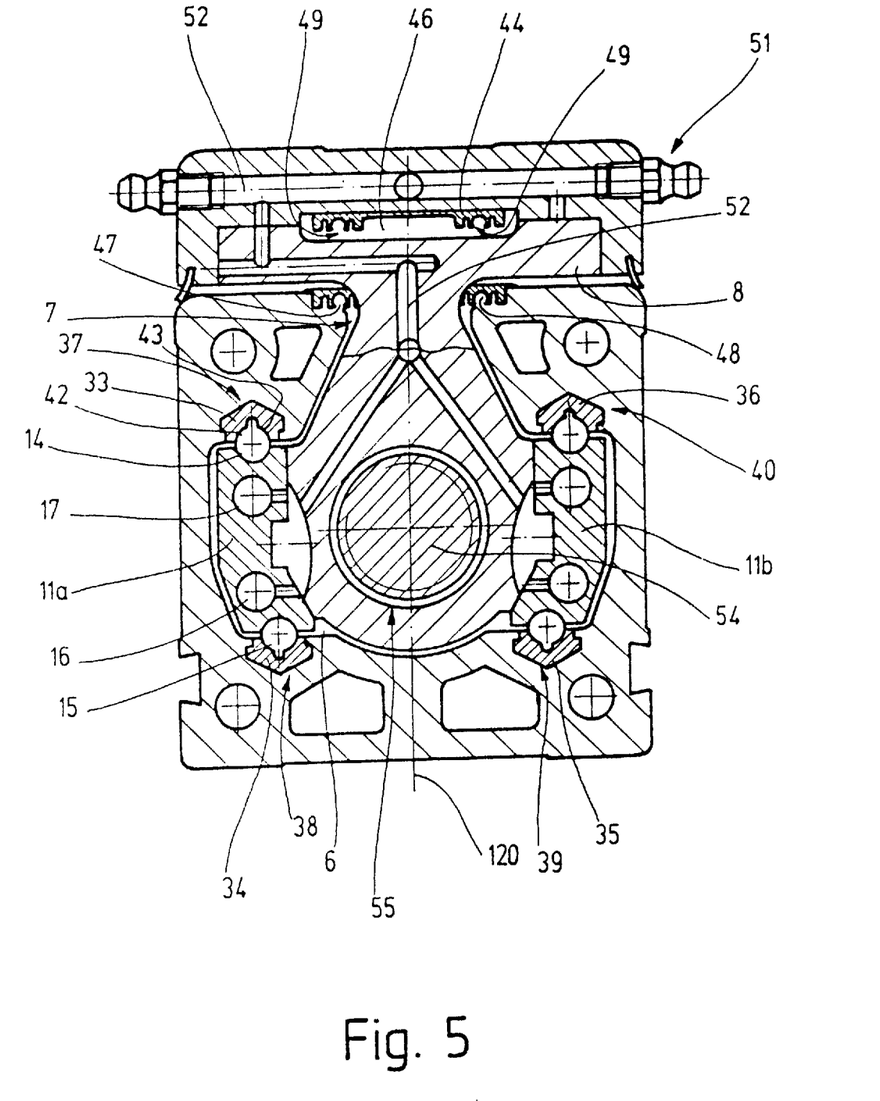
FIG. 5 is a cross-sectional view through the linear guide system of FIG. 1, to a different scale.

Referring first to FIG. 1: A linear guide system 1 has a guide body 2. A carriage 4 is movable along the axis of the guide body 2, in the directions of the double arrow 3. The longitudinal dimension of the carriage 4 is substantially less than that of the guide body 2. As best seen in FIGS. 2 and 5, the guide body is a profiled extruded tubular element, preferably made as an aluminum extrusion, and defines a longitudinal interior chamber or space 6. A longitudinal slit 7 extends from the space 6 outside of the guide body 2. Preferably, the guide body 2 has rectangular or square cross-section. The slit 7 extends in the direction of movement of the carriage 4, that is, along the double arrow 3, and is symmetrically located in the middle of the body 2 at one end face thereof.

FIG. 5 clearly shows that a force or motion transfer element 8 passes through the slit 7. The outer end of the transfer element 8 is coupled to a plate element, which forms the outer part of the carriage 4. The force or motion transfer element 8 is retained at the inner end in four bearings 9 in the space 6 within the guide body 2. The bearings 9 are formed by races 14, 15 or bearing elements 11a, 11b. The elements 11a, 11b are supported by balls 10 on suitable running tracks or surfaces 33, 34, 35, 36, 42, 43 within the body 2. The bearing elements 11a, 11b are located symmetrically to a plane 120 which also cuts the longitudinal slit 7. The bearing elements 11a, 11b are part of, or coupled to the force and motion transfer element 8. Reference will be made hereinafter merely to the "bearing element 11", since the bearing elements 11a, 11b are identical, or, rather, mirror symmetrical. Other elements, which occur in pairs, or in mirror symmetrical arrangement, likewise, will be referred to without the respective subscripts a and b, respectively.

Figures 3, 4A, 4B:
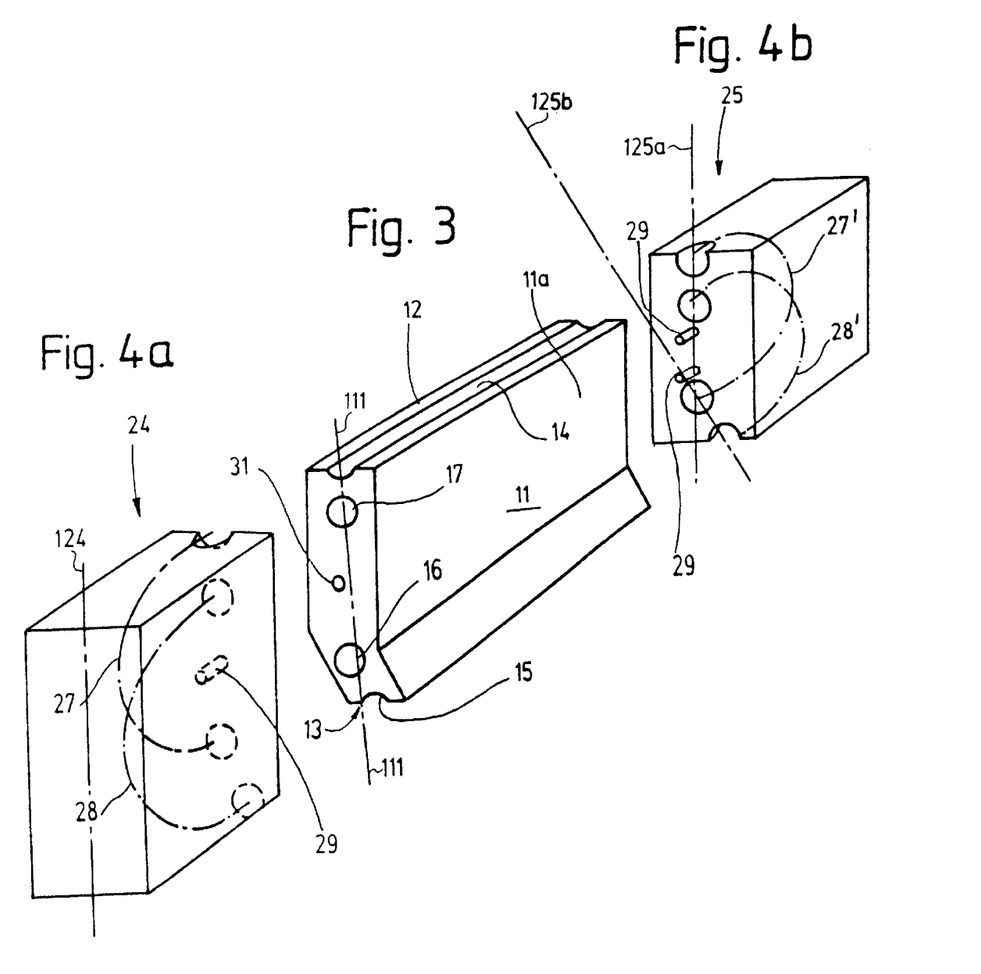
FIG. 3 is a perspective view of a part of the carriage of FIGS. 1 and 2, to another scale.
FIG. 4a and FIG. 4b are highly schematic, perspective views of ball return guide elements in which the ball return ducts are shown in chain-dotted lines.

The bearing element 11 (11a) shown in FIG. 3 is an essentially plate-like body which, as best seen in FIGS. 2 and 5 also, can be slightly curved, or angled about an axis extending in longitudinal direction of the body 2. The end portions 12 and 13 are formed with the running tracks 14, 15, which, in cross-section, are part circular, and which extend parallel with respect to each other in longitudinal direction.

The bearing elements 11 are additionally formed with two ball return ducts 16, 17.

In accordance with a feature of the invention, the lower ball return duct 16 is coupled, for ball circulation, by endpieces 24, 25 with the upper running track 14, and the upper ball return duct 17 is associated with the lower running track 15. This means that the ball return duct 16 for the balls on track 14 is close to and in the vicinity of the running track 15 and, conversely, the ball return duct 17 for the balls on track 15 is located in the immediate vicinity to the running track 14, that is, with a track through which the balls coursing through the duct 17 are not associated.

FIG. 5 illustrates that the return ducts 16, 17 are located in effectively one plane, in which, also, the upper running track 14 may be located. The lower running track 15 may be positioned in the same plane, or offset, so that the tracks 14, 15 on both sides of the carriage, see FIG. 5, are at corners of a trapeze, as illustrated; alternatively, they could be at corners of a rectangle, or a square.

In a preferred embodiment, the centers of duct 17 and adjacently located track 14 define a plane 125a, FIG. 4b, that intersects a plane 125b defined by the centers of duct 16 and track 15, with an obtuse angle. From the angle of the two planes 125a, 125b, one preferred plane may be found shown in FIG. 3 schematically at 111, which intersects all tracks 14, 15 and ducts 16, 17 at least in part, or peripherally.

It is also possible, of course, to position the running tracks 14 and 15 in other arrangements than in a single plane, while keeping the associated relationships of the running tracks and the return ducts in the arrangement described above.

As best seen in FIGS. 2 and 5, the bearing elements 11 can slide over the ball bearings 9, by interposition of the balls 10 which, in groups, are guided on the two separate complete paths or loops 21, 22, as schematically shown in FIG. 2. The loop 21 includes the return duct 16 and track 14. Loop 22 includes the duct 17 and the track 15.

To associate the respective tracks 14, 15 with the return ducts 16, 17, ball return guide elements 24, 25 are coupled to the carriage portions 11. FIG. 4a and FIG. 4b shows the ball return guide elements 24, 25, and the position alignment with the track carrier 11. The ball return guide 24 is mirror-symmetrical, with respect to longitudinal direction, to the return guide element 25, so that only one of the elements 24, 25 will be described for simplicity. The description is equally applicable to the other ball return guide element.

The ball return guide element 24 is a one-part, or a multiple-part, e.g. a two-part plastic body which retains the two return ducts 27, 28, which are shown as chain-dotted tracks, to couple the track 14 with the return duct 16 and track 15 with return duct 17. The ducts 16 and 17 have circular cross-section. Due to the relatively long spacing between the track 14 and the return duct 16, and track 15 and duct 17, the curvature of the ducts 16, 17 is so slight that the radius of curvature is relatively large, and, in any event, larger than one-quarter of the space of the tracks 14, 15, from each other. Element 24 may, originally, be in two or more parts, first separated along a longitudinal plane as schematically indicated by line 124, or along plane 111, or another plane or several planes extending longitudinally of the element 24, and then joined together.

The return duct 28, connecting track 15 with the return duct 17, passes along the return duct 27. The ducts 27, 28 cross in space, without, however, intersecting each other. Offsetting the lower track 15 from the upper track 14 results in inherent lateral separation of the ducts 27, 28 from each other.

The ducts in the element 25 of FIG. 4b have been given the same reference numerals with prime notation.

The ball return guide elements 24, 25 are coupled to the bearing elements 11 by a suitable interengaging projection-and-recess arrangement, for example by projecting pins or posts 29 extending from the ball return guide elements 24, 25 and fitting into matching openings 31, of which only one is shown in FIG. 3 for simplicity.

The bearings 9 include, in the body 2, steel rails 33, 34, 35, 36 which extend in the longitudinal direction shown by double arrow 3 (FIG. 1). The steel rails 33–36 are located at the corners of a trapeze (FIG. 5), and are fitted in suitably undercut grooves 37, 38, 39, 40 in the guide body 2. They can be longitudinally pushed into the grooves 37–40, and retained therein by an interfitting, dovetail or similar connection, see FIG. 2. To ensure good seating of the rails 33–36 in the grooves 37–40 and, further, to provide for good force and weight transfer, the rails are formed at their backsides in roof, or angled shape, and the grooves 37–40 are complementarily shaped.

Each one of the rails 33–36 has a longitudinally extending, generally part circular groove which is separated by a longitudinal depression or groove to form two running surfaces 42, 43 on which the balls 10 can run. This is shown in detail in FIG. 5 in connection with track 33.

The longitudinal slit 7 is closed off towards the outside by a cover tape 44 (FIGS. 1, 5). The tape is lifted in the region of the force or motion transfer element 4 off the longitudinal slit 7 and is guided through a longitudinal passage 46 in the outwardly positioned plate of the carriage 4. The cover tape 44 is retained at its two ends in the guide body 2, and coupled to the guide body 2 at a location away from the carriage 4. The guide body 2 is formed with upwardly extending locking ribs 47, 48 at both sides of the longitudinal slit 7. A groove, corresponding to the ribs 47, 48 and formed by longitudinally extending ribs 49 projecting from the cover tape 44 hold the cover tape on the ribs 47, 48. The referenced application Ser. No. 08/799,621, filed Feb. 12, 1997, Barth et al., (Attorney Docket 970048-shf; PA 22 US sg) is here referred to for details.

The bearing elements 11, the balls 10 and the steel rails 33–36 can be lubricated. One or more lubrication nipples 51 are located on the carriage 4 which provide lubricant via lubrication ducts 52 to the ball return ducts 16, 17, the bearing elements 11a, 11b and the tracks thereon, as schematically shown in FIG. 5.

If the carriage 4 is to be a force transfer element, the carriage 4 can be driven in the respective direction of the double arrow 3 by providing a drive 53 (FIG. 1) and engaging the force transfer element 8. Preferably, unit 53 is an electric motor coupled to one end of the guide body 2 and which drives an elongated threaded spindle 54 (FIG. 5) extending longitudinally through the guide body 2. The force transfer element 8 then has a threaded bore 55 to receive the spindle 54. The other end of the spindle 54 is located in a spindle bearing 56 formed at an end cover plate secured to the guide body 2. The end body plate also locates the steel rails or tracks 33–36 in the respective grooves 37–40.

The drive system 53, spindle 54 and end element 55 are not necessary if the transfer element is otherwise moved, as desired; or, selectively, may be replaced by suitable sensors or the like.

OPERATION

The plate of the carriage 4 and the force transfer element 8 are supported by the two bearing elements 11a, 11b and balls 10 on the steel tracks 33–36 located within the guide body 2. The carriage 4 is thus secured in position with respect to radial forces, with reference to the movement along the double arrow 3; it is, likewise, circumferentially reliably located.

The carriage 4 is movable in the respective direction of the double arrow 3. If the carriage 4 receives an axial, that is, longitudinal movement, the bearing elements 11a, 11b with their tracks 14, 15, run on the balls 10 which, in turn, are located between and engaged against the running surfaces 42, 43 of the steel rails 33–36. The balls 10, which leave the bearing elements 11 at the trailing ends thereof after having run between the tracks 14, 15 and the rails 33–36, then pass into the ball return guide ducts 27', 28' of the ball return guide element 25 and are thereby guided into the ball return ducts 16, 17 passing through the bearing elements 11a, 11b. After passage of the balls through the ducts 16, 17, the balls enter the return ducts 27, 28 of the ball return guide element 24, to be returned to the tracks 14, 15 of the bearing elements 11a, 11b. This closed loop path is, in part, indicated symbolically by the arrows 21, 22.

The rows of balls, which are guided back with a large deflection radius, and in a crossing arrangement ensure quiet and smooth running, even if the operating speed in the respective direction, see arrow 3, FIG. 1, is high. The transition of the balls 10 between the bearing elements 11 and the ball return guide elements 24, 25 is obtained by precise alignment of the elements 24, 25 with respect to the carriage 8, and, specifically, the bearing elements 11. The integral pins or posts 29, engaging in suitable holes 31 of the bearing elements 11, ensure precise alignment of the ducts 16, 17 with the ball return guide ducts 27, 28, 27', 28', respectively.

The assembly of the system, with precision placement of the spatial direction of the running surfaces 42, 43 on the rails 33–46 in grooves 37–40 is obtained by fitting the rails within the respective grooves in longitudinal direction, where the running tracks or rails 33–36 are held in interengaging manner. The axial direction is determined by the drive system 53 and the spindle bearing 56 at the remote end, or suitable similar arrangements. There is no additional assembly step necessary to secure the rails 33–36 in the guide body 2.

Preferably, two ball circulating loops 21, 22 are used for the bearings of the carriage 4 in the guide body 2. The circulating ball loops 21, 22 are so arranged that, in the region of the curved return paths, the return paths cross over. This permits a return radius which is substantial, and to easily locate the return ducts 16, 17, passing through the bearing elements 11 of the carriage 4. A compact construction and simplified manufacture is thereby obtained, with, at the same time, quiet operation, even at high moving speeds due to the large return guide radii of the ducts 27, 28 in elements 24, 25. The crossing return guide ducts 27, 28 are preferably provided in separate plastic elements 24, 25 fitted at the end sides on the carriage 4 or, respectively, its bearing elements 11. The outer part 4 of the carriage, and its primarily interior element 8, thus are reliably guided by steel rails, forming tracks 33–36 located in the interior 6 of the guide body 2. Preferably, the guide body 2 is an extruded aluminum profile body. The rails 33–36 are located in undercut grooves 37–40, by being pushed into these grooves, and retained therein by end caps, which may also be formed as a spindle drive, and a spindle bearing, if a central spindle 54 is used.

Various changes and modifications may be made within the scope of the inventive concept.

We claim:
1. Linear guide system having
    a tubular guide body (2),
    spaced apart, parallel guide tracks (33–36, 42, 43) extending along a movement path,
    a movable guide force or motion transfer element (4, 8) externally accessible from said body (2),
    a plurality of longitudinal bearings (9) between said transfer element (4) and the body (2),
    rolling means (10) movably coupling said element (4, 8) and said body (2) through said bearing (9), said rolling means, optionally, comprising ball bearing balls; and
    rolling means return guides (24, 25) for receiving the rolling means (10) for return and recirculation thereof to said bearing (9) and to cause said rolling means to operate in a closed path or loop,
    wherein
    the bearing means (9) are located in an interior space (6) of said tubular body (2) and which extends longitudinally of the body (2);
    a drive unit (53) operatively coupled to said carriage for longitudinally positioning the carriage on said guide body (2);
    a power transfer system (54, 55) coupling said drive unit (53) to the carriage, and located within the interior of said tubular guide body (2); and
    wherein the longitudinal bearings (9) include bearing elements (11) on said carriage, said bearing elements (11) being located in the interior space (6) and laterally adjacent said drive system (54).

2. The system of claim 1, wherein said rolling means return guides (24, 25) are formed with return path ducts (27, 28) which define return paths, and said return path ducts (27, 28) are positioned within said return guides (24, 25) in spatially separated crossing relationship.

3. The system of claim 1, wherein at least three longitudinal bearings are provided within the interior space (6) of the body (2).

4. The system of claim 1, wherein said guide tracks comprise steel rails (33–36); and
said guide body (2) comprises an elongated extruded rail element, said steel rails being longitudinally inserted in said body and retained therein by an interengaging or interlocking fit.

5. The system of claim 1, wherein said guide body (2) comprises an aluminum extruded profiled rail.

6. The system of claim 1, wherein the force or motion transfer element (4, 8) comprises a carriage having a portion (4) located outside of the interior space (6) of the body (2), and an interior element (8);
said longitudinally extending bearings including bearing elements (11) forming part of the carriage and coupled to said interior element (8);
and a longitudinal slit (7) formed in said guide body (2) through which said force or motion transfer element extends.

7. The system of claim 6, further including a cover tape (44) sealing said longitudinal slit (7); and
interengaging coupling means are provided on the guide body (2) and on the tape (44), respectively.

8. The system of claim 6, wherein each bearing element (11) is formed with two guide tracks (14, 15) for said rolling means (10).

9. The system of claim 8, wherein at least two bearing elements (11a, 11b) are coupled with the carriage,
bearing tracks (14, 15) formed on each bearing element, one each associated with a body bearing track (33–36) on said tubular guide body (2), with said rolling means (10) interposed, said body bearing tracks (33–36), said rolling means (1) and said element bearing tracks forming said bearing (9).

10. The system of claim 1, wherein two closed loops (21, 22), in which rolling means (10) are guided, are provided,
wherein each loop comprises
a straight bearing portion (14, 15), wherein said rolling means (10) are interposed between body guide tracks (33–36, 42, 43) and element tracks (14, 15) on said bearing elements (11);
two straight return path portions (16, 17) through said bearing elements (11); and
two curved return path portions (27, 28, 27', 28') coupling the straight bearing portions (14, 15) and the straight return path portions (16, 17) together,
and wherein the curved return path portions (27, 28, 27', 28') of said two loops cross where the two loop paths cross, without, however, intersecting.

11. The system of claim 10, wherein one (14) of the straight bearing portions (14) and at least one straight return duct portion (16, 17) are located in one plane (125a); and
the other straight bearing portion (15) is located in a plane (125b) laterally spaced from said one plane (125), to facilitate spatial separation of the crossing curved return path portions (27, 28) within the rolling means return guide elements (24, 25).

12. The system of claim 10, wherein said rolling means (10), in said return path portions (27, 28, 27', 28'), are guided about a radius of curvature which is greater than about a quarter of the spacing of said bearing tracks (14, 15) from each other.

13. The system of claim 10, wherein at least some of said straight path portions (14, 15) and the return path portions (16, 17) are located in a common plane.

14. The system of claim 10, wherein rolling means return guide elements (24, 25) are provided and retaining the crossing return path portions (27, 28, 27', 28') of said two closed rolling means circulating loops.

15. The system of claim 14, wherein said rolling means return guide elements (24, 25) comprise multiple-part elements.

16. The system of claim 1, wherein said bearings (9) include bearing elements (11) on said force or motion transfer element (4, 8);
rolling means tracks (14, 15) formed on said bearing elements (11) at two oppositely positioned sides thereof; and
wherein said bearing elements are formed with two return path ducts (16, 17) therethrough, one each duct being associated with a rolling means track (14, 15) on the bearing element; and
wherein rolling element return guide element portions (24, 25) are provided on each bearing element (11), comprising two crossing, but not intersecting return guide ducts (27, 28) to couple a track (14, 15) with an associated return duct (16, 17), to form two rolling means loops (21, 22).

17. The system of claim 16, wherein the return duct (16, 17) of one rolling means loop (21, 22) is located in the immediate vicinity of the bearing track (15, 14) of the other rolling means loop (22, 21).

18. The system of claim 16, wherein the bearing means return guide element (24, 25), and the bearing element (11) are separate units, and an interengaging, interlocking projection-and-recess means (29, 31) is provided, coupling the rolling means return guide means and the bearing element together.

19. The system of claim 16, wherein said interengaging coupling means (29, 31) retain the rolling means return guide element on the bearing element comprises an interfitting projection (29) and recess (31) arrangement.

20. Linear guide system having
a tubular guide body (2),
spaced apart, parallel guide tracks (33–36, 42, 43) extending along a movement path,
a movable guide force or motion transfer element (4, 8) externally accessible from said body (2),
force or motion transfer element (4, 8) including a carriage having a portion (4) located outside of the interior space (6) of the body (2), and an interior element (8);
a longitudinal slit (7) formed in said guide body (2) through which said force or motion transfer element (4, 8) extends;
a cover tape (44) sealing said longitudinal slit (7);
interengaging coupling means on the guide body (2) and ont the tape (44), respectively;
a plurality of longitudinal bearings (9) between said transfer element (4) and the body (2), said longitudinally extending bearings including bearing elements (11) forming part of the carriage and coupled to said interior element (8);
rolling means (10) movably coupling said element (4, 8) and said body (2) through said bearing (9), said rolling means, optionally, comprising ball bearing balls, and
rolling means return guides (24, 25) for receiving the rolling means (10) for return and recirculation thereof to said bearing (9) and to cause said rolling means to operate in a closed path or loop; and
the bearing means (9) are located in an interior space (6) of said tubular body (2) and which extends longitudinally of the body (2).

21. The system of claim 20, wherein said bearings (9) include bearing elements (11) on said force or motion transfer element (4, 8);

rolling means tracks (14, 15) formed on said bearing elements (11) at two oppositely positioned sides thereof; and wherein said bearing elements are formed with two return path ducts (16, 17) therethrough, one each duct being associated with a rolling means track (14, 15) on the bearing element; and wherein rolling element return guide element portions (24, 25) are provided on each bearing element (11), comprising two crossing, but not intersecting return guide ducts (27, 28) to couple a track (14, 15) with an associated return duct (16, 17), to form two rolling means loops (21, 22).

22. The system of claim 21, wherein the return duct (16, 17) of one rolling means loop (21, 22) is located in the immediate vicinity of the bearing track (15, 14) of the other rolling means loop (22, 21).

23. The system of claim 21, wherein the bearing means return guide element (24, 25), and the bearing element (11) are separate units, and an interengaging, interlocking projection-and-recess means (29, 31) is provided, coupling the rolling means return guide means and the bearing element together.

24. The system of claim 21, wherein said interengaging coupling means (29, 31) retain the rolling means return guide element on the bearing element comprises an interfitting projection (29) and recess (31) arrangement.

25. The system of claim 20, wherein said guide body (2) comprises an aluminum extruded profiled rail.

26. The system of claim 20, further comprising a drive unit (53) operatively coupled to said carriage for longitudinally positioning the carriage on said guide body (2).

27. The system of claim 26, further including a power transfer system (54, 55) coupling said drive unit (53) to the carriage, and located within the interior of said tubular guide body (2); and wherein the longitudinal bearings (9) include bearing elements (11) on said carriage, said bearing elements (11) being located in the interior space (6) and laterally adjacent said drive system (54).

28. The system of claim 20, wherein each bearing element (11) is formed with two guide tracks (14, 15) for said rolling means (10).

29. The system of claim 28, wherein at least two bearing elements (11a, 11b) are coupled with the carriage, bearing tracks (14, 15) formed on each bearing element, one each associated with a body bearing track (33–36) on said tubular guide body (2), with said rolling means (10) interposed, said body bearing tracks (33–36), said rolling means (1) and said element bearing tracks forming said bearing (9).

30. The system of claim 20, wherein said rolling means return guides (24, 25) are formed with return path ducts (27, 28) which define return paths, and said return path ducts (27, 28) are positioned within said return guides (24, 25) in spatially separated crossing relationship.

31. The system of claim 20, wherein two closed loops (21, 22), in which rolling means (10) are guided, are provided, wherein each loop comprises a straight bearing portion (14, 15), wherein said rolling means (10) are interposed between body guide tracks (33–36, 42, 43) and element tracks (14, 15) on said bearing elements (11);

two straight return path portions (16, 17) through said bearing elements (11); and two curved return path portions (27, 28, 27', 28') coupling the straight bearing portions (14, 15) and the straight return path portions (16, 17) together, and wherein the curved return path portions (27, 28, 27', 28') of said two loops cross where the two loop paths cross, without, however, intersecting.

32. The system of claim 31, wherein said rolling means (10), in said return path portions (27, 28, 27', 28'), are guided about a radius of curvature which is greater than about a quarter of the spacing of said bearing tracks (14, 15) from each other.

33. The system of claim 31, wherein at least some of said straight path portions (14, 15) and the return path portions (16, 17) are located in a common plane.

34. The system of claim 31, wherein rolling means return guide elements (24, 25) are provided and retaining the crossing return path portions (27, 28, 27', 28') of said two closed rolling means circulating loops.

35. The system of claim 34, wherein said rolling means return guide elements (24, 25) comprise multiple-part elements, optionally of plastic.

36. The system of claim 31, wherein one (14) of the straight bearing portions (14) and at least one straight return duct portion (16, 17) are located in one plane (125a); and the other straight bearing portion (15) is located in a plane (125b) laterally spaced from said one plane (125), to facilitate spatial separation of the crossing curved return path portions (27, 28) within the rolling means return guide elements (24, 25).

37. The system of claim 20, wherein at least three longitudinal bearings are provided within the interior space (6) of the body (2).

38. The system of claim 20, wherein said guide tracks comprise steel rails (33–36); and said guide body (2) comprises an elongated extruded rail element, said steel rails being longitudinally inserted in said body and retained therein by an interengaging or interlocking fit.

* * * * *